(12) United States Patent
Kato et al.

(10) Patent No.: US 11,521,437 B2
(45) Date of Patent: Dec. 6, 2022

(54) IN-VEHICLE DEVICE, INFORMATION PROCESSING METHOD, AND COMPUTER READABLE MEDIUM

(71) Applicant: MITSUBISHI ELECTRIC CORPORATION, Tokyo (JP)

(72) Inventors: Toshikazu Kato, Tokyo (JP); Hitoshi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 97 days.

(21) Appl. No.: 16/962,303

(22) PCT Filed: Mar. 5, 2018

(86) PCT No.: PCT/JP2018/008381
§ 371 (c)(1),
(2) Date: Jul. 15, 2020

(87) PCT Pub. No.: WO2019/171437
PCT Pub. Date: Sep. 12, 2019

(65) Prior Publication Data
US 2020/0342697 A1    Oct. 29, 2020

(51) Int. Cl.
*G07C 5/08* (2006.01)
*B60W 40/02* (2006.01)
(Continued)

(52) U.S. Cl.
CPC ........... *G07C 5/0816* (2013.01); *B60W 40/02* (2013.01); *G05D 1/0212* (2013.01); *G06V 20/56* (2022.01);
(Continued)

(58) Field of Classification Search
CPC ... G07C 5/0816; B60W 40/02; G05D 1/0212; G05D 2201/0213; G06K 9/00791; G08G 1/0967
(Continued)

(56) References Cited

U.S. PATENT DOCUMENTS 6,438,471 B1    8/2002 Katagishi et al.
9,601,015 B2 *  3/2017 Rennie ................. H04W 4/024
(Continued)

FOREIGN PATENT DOCUMENTS

JP    2002-334166 A    11/2002
JP    2009-129054 A    6/2009
(Continued)

OTHER PUBLICATIONS

International Search Report, issued in PCT/JP2018/008381, PCT/ISA/210, dated May 15, 2018.
(Continued)

*Primary Examiner* — Yazan A Soofi
(74) *Attorney, Agent, or Firm* — Birch, Stewart, Kolasch & Birch, LLP

(57) ABSTRACT

A storage device (301) stores a failure correspondence table (405) that indicates a countermeasure for a time when a failure occurs in an apparatus mounted on a vehicle (100). A failure countermeasure update unit (404) updates the countermeasure indicated in the failure correspondence table (405) in accordance with a change in a traveling environment of the vehicle (100).

8 Claims, 8 Drawing Sheets

(51) Int. Cl.
  *G05D 1/02* (2020.01)
  *G08G 1/0967* (2006.01)
  *G06V 20/56* (2022.01)
(52) U.S. Cl.
  CPC ... *G08G 1/0967* (2013.01); *G05D 2201/0213* (2013.01)
(58) Field of Classification Search
  USPC .......................................................... 701/29
  See application file for complete search history.

(56) References Cited

U.S. PATENT DOCUMENTS

| | | | | |
|---|---|---|---|---|
| 2002/0193926 | A1* | 12/2002 | Katagishi | G06Q 10/06 701/32.4 |
| 2003/0182034 | A1* | 9/2003 | Katagishi | G06Q 10/06 701/32.4 |
| 2004/0210363 | A1* | 10/2004 | Katagishi | G06Q 10/06 701/32.4 |
| 2008/0230345 | A1* | 9/2008 | Minami | F16D 48/06 192/30 W |
| 2014/0159924 | A1* | 6/2014 | Lee | G08G 1/081 340/907 |
| 2015/0281453 | A1* | 10/2015 | Maturana | G05B 23/0213 379/265.12 |
| 2016/0140782 | A1* | 5/2016 | Ito | B60W 50/0205 701/99 |
| 2017/0248969 | A1* | 8/2017 | Ham | G05D 1/1064 |
| 2019/0300010 | A1* | 10/2019 | Miyauchi | G05D 1/0088 |
| 2020/0114930 | A1* | 4/2020 | Syafril | G07C 5/008 |
| 2020/0342697 | A1* | 10/2020 | Kato | G08G 1/0967 |
| 2020/0344658 | A1* | 10/2020 | Huang | H04W 36/22 |
| 2021/0224671 | A1* | 7/2021 | Cristache | G06F 40/216 |

FOREIGN PATENT DOCUMENTS

| | | |
|---|---|---|
| JP | 2009-193486 A | 8/2009 |
| JP | 2016-94078 A | 5/2016 |
| JP | 2016-207118 A | 12/2016 |
| JP | 2017-35979 A | 2/2017 |
| WO | WO 2017/208416 A1 | 12/2017 |

OTHER PUBLICATIONS

Seigo Kuzumaki, "Progress Report on SIP 'Automated Driving Systems'", Nov. 1, 2016, p. 7-9.
Office Action dated Dec. 28, 2021 in corresponding Chinese Application No. 201880090186.0.

* cited by examiner

Fig. 7

| FAILURE DETAIL | TRAVELING ENVIRONMENT | COUNTERMEASURE |
|---|---|---|
| FAILURE OF CONTROL DEVICE | EXPRESSWAY | TRAVEL TO NEAREST REPAIR PLANT BY DEGENERATION FUNCTION |
| ... | ... | ... |

Fig. 8

| FAILURE DETAIL | TRAVELING ENVIRONMENT | COUNTERMEASURE |
|---|---|---|
| FAILURE OF CONTROL DEVICE | EXPRESSWAY | STOP VEHICLE AT ROAD SHOULDER AFTER PASSING CONSTRUCTION SITE |
| ... | ... | ... |

IN-VEHICLE DEVICE, INFORMATION PROCESSING METHOD, AND COMPUTER READABLE MEDIUM

TECHNICAL FIELD

The present invention relates to control when a failure occurs in an apparatus mounted on a vehicle.

BACKGROUND ART

In an electronic control device of an advanced drive assist system including an automated driving system for which high level of safety is required, the system is multiplexed so that an apparatus mounted on a vehicle is prevented from being out of control even when a failure occurs in the apparatus. By multiplexing a system, even one system fails, it is possible to continue processing by a degeneration function, by using a remaining normal system. In such an advanced drive assist system, when a failure occurs in an apparatus mounted on a vehicle, it is important to select and perform what kind of countermeasure (stop the vehicle at a road shoulder, continue driving, or hand over driving to a driver, etc.). Especially, it is important to select the most suitable countermeasure that is capable of ensuring safety of a user.

Patent Literature 1 discloses a technique to dynamically select a countermeasure from a failure correspondence table in accordance with actual failure details (failure parts and severity, etc.) and a traveling environment (a traveling position and a peripheral condition, etc.) when a failure occurs in the advanced drive assist system.

In Patent Literature 1, it is also considered that there is a case dangerous for a user if a fixed countermeasure at failure (to always decelerate and stop at a road shoulder, etc.) is simply performed. More specifically, in Patent Literature 1, a countermeasure in consideration of user safety is statically defined in a table (represented as a failure correspondence table hereinafter) in accordance with a combination of failure details and a traveling environment. Then, Patent Literature 1 dynamically selects a countermeasure from the failure correspondence table when a failure occurs, in accordance with actual failure details and traveling environment.

Meanwhile, along with development of the advanced drive assist system, construction of a dynamic map being a high-precision three-dimensional map is promoted for estimation of vehicle position and route specification.

A dynamic map is capable of providing dynamic information related to a map or traffic (Non-Patent Literature 1). More specifically, the dynamic map manages information having less temporal variation such as information on road surfaces or buildings to information having large temporal variation such as information on road construction, traffic congestion or peripheral vehicle condition, etc. by dividing the information into hierarchies based on a degree of temporal variation. Then, in the dynamic map, by overlaying information of several layers, it is possible to provide map information including dynamic information on traveling environment of vehicles.

CITATION LIST

Patent Literature

Patent Literature 1: WO2017-208416 A

Non-Patent Literature

Non-Patent Literature 1: Seigo KUZUMAKI, "Progress Report on SIP 'Automated Driving Systems'", pp. 7-9, Nov. 1, 2016, http://www.sip-adus.jp/evt/media/file/evt_2016_media_sip_report.pdf.

SUMMARY OF INVENTION

Technical Problem

In Patent Literature 1, a failure correspondence table is prepared statically. However, the traveling environment of vehicles changes every second due to variety of factors. Therefore, there is a problem that users cannot always select a safe countermeasure only with countermeasures corresponding to combinations of conditions set beforehand in the failure correspondence table. It may seem to be possible to resolve this problem by assuming countermeasures corresponding to every type of traveling environment beforehand, and by defining the countermeasures assumed in the failure correspondence table. However, in this method, the number of the combinations of conditions increases explosively. Therefore, construction of the failure correspondence table is difficult, and impractical.

The dynamic map disclosed in Non-Patent Literature 1 provides the map information corresponding to ever-changing traveling environment of vehicles. However, the dynamic map does not provide information on countermeasures for a time when an apparatus mounted on a vehicle fails. Therefore, it is not possible to resolve the problem in Patent Literature 1 only by referring to the dynamic map.

The present invention is aimed at solving such problems. More specifically, the present invention is aimed at making it possible to select a suitable countermeasure corresponding to traveling environment of a vehicle when a failure occurs in an apparatus mounted on the vehicle.

Solution to Problem

An in-vehicle device to be mounted on a vehicle according to the present invention, the in-vehicle device includes:

a storage unit to store a failure correspondence table that indicates a countermeasure for a time when a failure occurs in an apparatus mounted on the vehicle, and a failure countermeasure update unit to update the countermeasure indicated in the failure correspondence table in accordance with a change in a traveling environment of the vehicle.

Advantageous Effects of Invention

In the present invention, a countermeasure indicated in a failure correspondence table is updated in accordance with a change in traveling environment of a vehicle. Therefore, according to the present invention, it is possible to select a suitable countermeasure in accordance with the traveling environment of the vehicle when a failure occurs in an apparatus mounted on the vehicle.

BRIEF DESCRIPTION OF DRAWINGS

FIG. 7 is a diagram illustrating an example of a failure correspondence table according to the first embodiment; and FIG. 8 is a diagram illustrating an example of the failure correspondence table after update according to the first embodiment.

DESCRIPTION OF EMBODIMENTS

Figure 1:
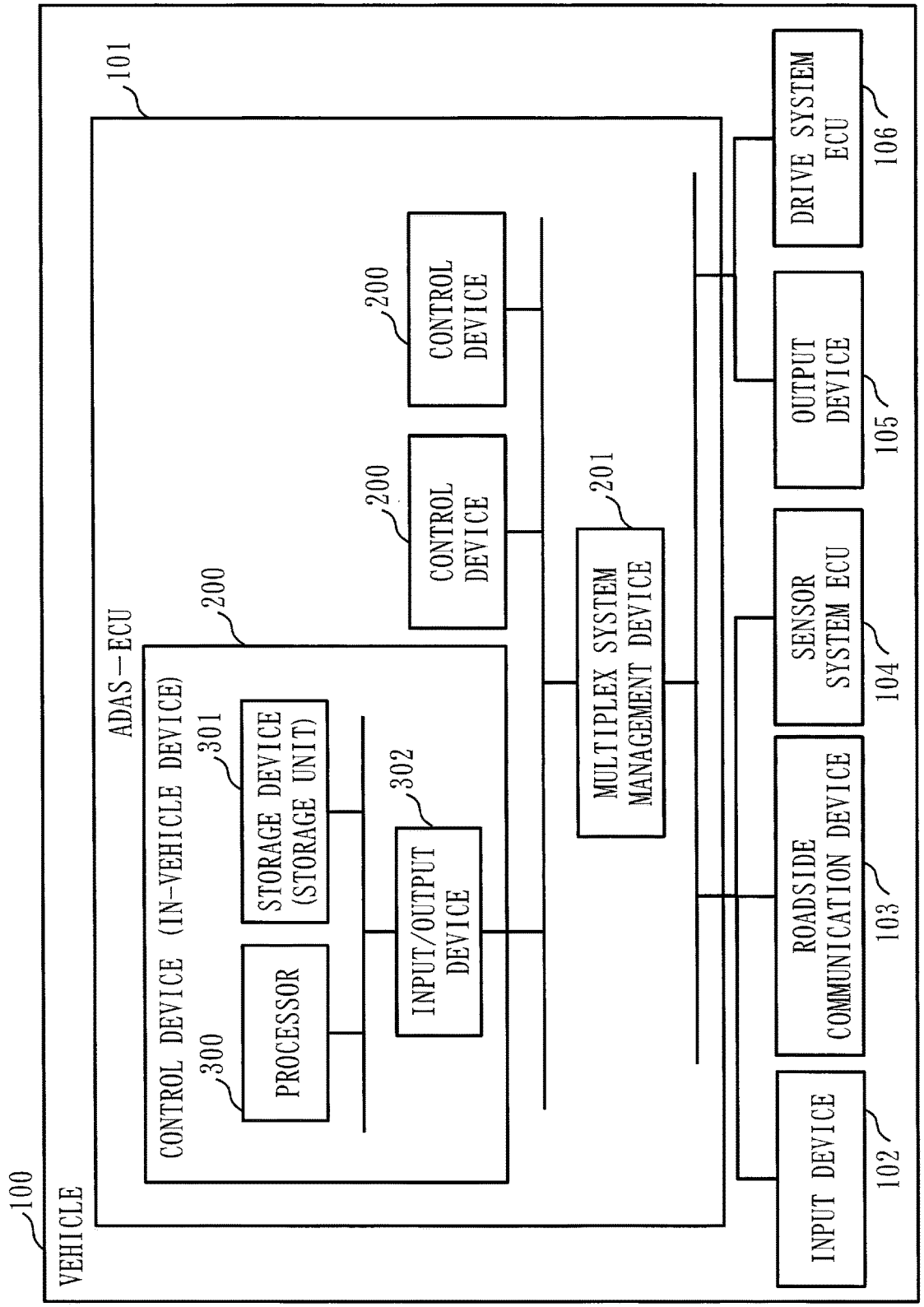
FIG. 1 is a diagram illustrating an example of a hardware configuration of a control device according to a first embodiment.

Hereinafter, embodiments of the present invention will be described using diagrams. In the following explanation and diagrams of the embodiments, same elements or corresponding elements are denoted by same reference numerals.

First Embodiment

Explanation of Configuration

FIG. 1 illustrates an example of a hardware configuration of a control device 200 and components surrounding the control device 200 according to a first embodiment.

The control device 200 is a computer that is mounted on a vehicle 100 being a subject of traveling by automated driving. The control device 200 corresponds to an in-vehicle apparatus. Further, an operation performed by the control device 200 corresponds to an information processing method.

The control device 200 is mounted on an advanced driver assistance system-electronic control unit (ADAS-ECU) 101.

The ADAS-ECU 101 realizes automated driving.

The control device 200 is multiplexed so as to ensure safety against failure during traveling by automated driving.

The control device 200 includes a processor 300, a storage device 301 and an input/output device 302, which are connected via a bus.

All control devices 200 have a same hardware configuration.

A processor 300 is a processing device to perform cognitive process, determination process and control process, etc. in traveling by automated driving.

The processor 300 reads out and executes a program stored in a storage device 301. The program realizes a vehicle condition specification unit 400, a traveling environment specification unit 401, a driving operation control unit 402, a failure correspondence unit 403 and a failure countermeasure update unit 404. The program corresponds to an information processing program.

The processor 300 is, for example, a central processing unit (CPU) or a graphical processing unit (GPU).

The storage device 301 stores the above-mentioned program and data. Further, the storage device 301 is also a storage area of a failure correspondence table 405 and map information 406 as described below. The storage device 301 corresponds to a storage unit.

The storage device 301 is, for example, a random access memory (RAM), a hard disk drive (HDD) or a flash memory.

The input/output device 302 connects an input device 102, a roadside communication device 103, a sensor system ECU 104, an output device 105 and a drive system ECU 106 existing outside the ADAS-ECU 101 with the processor 300 and the storage device 301.

The input/output device 302 may directly connect the input device 102, the roadside communication device 103, the sensor system ECU 104, the output device 105 and the drive system ECU 106 with the processor 300 and the storage device 301, or may connect the same via a multiplex system management device 201.

The input/output device 302 is, for example, a control area network (CAN) interface, a universal serial bus (USB) (registered trademark) interface, or an Ethernet (registered trademark) interface.

The ADAS-ECU 101 is mounted on the vehicle 100 being the subject of traveling by automated driving, including a plurality of control devices 200 multiplexed and the multiplex system management device 201.

The multiplex system management device 201 manages the control devices 200 multiplexed.

More specifically, the multiplex system management device 201 performs process of timing arbitration of data input into each control device 200, failure detection by majority decision process of a plurality of pieces of data output from each control device 200, and disconnection of a control device 200 that has failed.

In addition to the ADAS-ECU 101, the vehicle 100 includes the input device 102, the roadside communication device 103, the sensor system ECU 104, the output device 105 and the drive system ECU 106.

The input device 102, the roadside communication device 103, the sensor system ECU 104, the output device 105 and the drive system ECU 106 are connected to the ADAS-ECU 101 by a signal lines such as a CAN, a USB (registered trademark), an Ethernet (registered trademark), etc.

The input device 102 receives input of driving operation from a driver of the vehicle 100.

The input device 102 converts an input signal from a wheel and a foot pedal, etc. into a digital signal, and transfers the digital signal obtained by conversion to the ADAS-ECU 101 or the drive system ECU 106.

The roadside communication device 103 performs wireless communication with an external device such as a roadside unit set at a road side.

The roadside communication device 103 receives, for example, map information, traffic information and weather information in a dynamic map 600, from the roadside unit.

The sensor system ECU 104 acquires detection result information indicating a detection result of a sensor attached to the vehicle 100.

The sensor attached to the vehicle 100 includes, for example, a camera, a millimeter wave radar, and a sensor of a light detection and ranging (LIDAR), which are used in traveling by automated driving. Further, the sensor attached to the vehicle 100 includes a sensor to detect an operation state of an apparatus mounted on the vehicle 100.

The output device 105 outputs information to a driver of the vehicle 100 and a vehicle other than the vehicle 100.

The output device 105 outputs, for example, information notifying of a traveling state or information notifying of a failure state. The output device 105 is, for example, a display, a speaker and a light source.

The drive system ECU 106 controls an accelerator, a steering and a brake, etc. based on control information provided by the ADAS-ECU 101 or the driver of the vehicle 100.

Each component illustrated in FIG. 1 may be implemented in a form wherein functions are divided, or may be implemented in a form wherein functions are integrated. Further, a communication topology connecting each component may also be different from that illustrated in FIG. 1 as long as a similar function is obtained.

Figure 2:
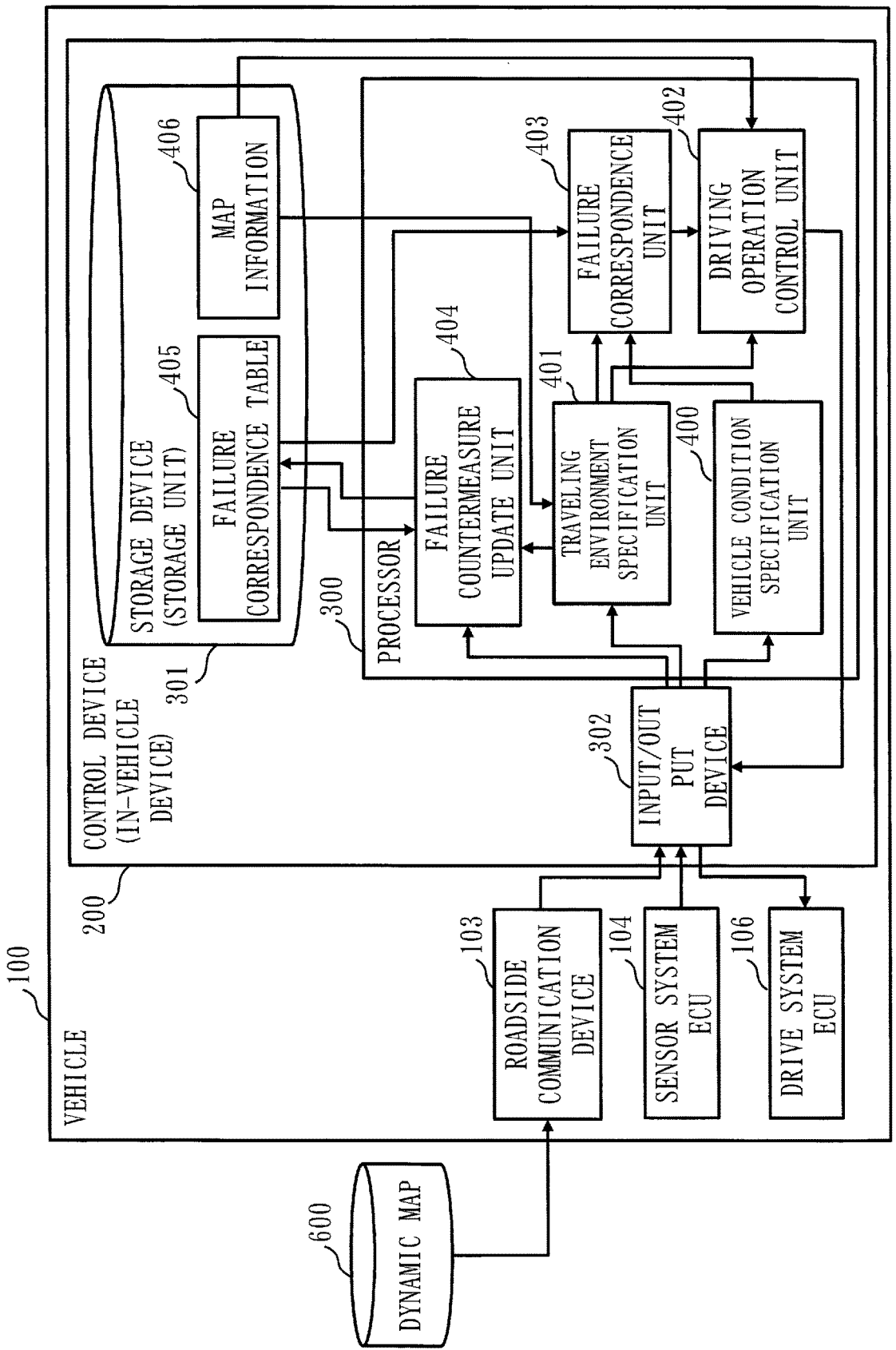
FIG. 2 is a diagram illustrating an example of a functional configuration of the control device according to the first embodiment.

FIG. 2 illustrates an example of a functional configuration of the control devices 200 according to the first embodiment.

All the control devices 200 illustrated in FIG. 1 are assumed to include the functional configuration of FIG. 2.

The control devices 200 include the vehicle condition specification unit 400, the traveling environment specification unit 401, the driving operation control unit 402, the failure correspondence unit 403 and the failure countermeasure update unit 404, as the functional configuration.

Further, the control devices 200 include the failure correspondence table 405 and the map information 406, as a data configuration.

The vehicle condition specification unit 400, the traveling environment specification unit 401, the driving operation control unit 402, the failure correspondence unit 403 and the failure countermeasure update unit 404 are realized by software (program). The program to realize the vehicle condition specification unit 400, the traveling environment specification unit 401, the driving operation control unit 402, the failure correspondence unit 403 and the failure countermeasure update unit 404 are executed by the processor 300.

FIG. 2 schematically illustrates a state wherein the processor 300 executes the program to realize functions of the vehicle condition specification unit 400, the traveling environment specification unit 401, the driving operation control unit 402, the failure correspondence unit 403 and the failure countermeasure update unit 404.

The failure correspondence table 405 and the map information 406 are stored in the storage device 301.

In FIG. 2, description of the multiplex system management device 201, the input device 102 and the output device 105 is omitted due to a reason of drawing.

The vehicle condition specification unit 400 acquires detection result information of a sensor from the sensor system ECU 104 via the input/output device 302, analyzes an operation state of an apparatus mounted on the vehicle 100, and detects a failure of the apparatus mounted on the vehicle.

Further, the vehicle condition specification unit 400 specifies a failure details (a failure part and severity, etc.) from the detection result information, and generates failure information indicating the failure details. Then, the vehicle condition specification unit 400 transmits the failure information to the failure correspondence unit 403 so as to decide a countermeasure.

"The apparatus mounted on the vehicle 100" includes the input device 102, the roadside communication device 103, the sensor system ECU 104, the output device 105, the drive system ECU 106, the control devices 200 and the multiplex system management device 201 illustrated in FIG. 1. Further, "the apparatus mounted on the vehicle 100" includes all elements mounted on the vehicle 100 in addition to the apparatus illustrated in FIG. 1.

The traveling environment specification unit 401 acquires traveling environment information being information related to a traveling environment of the vehicle 100.

Then, the traveling environment specification unit 401 specifies the traveling environment of the vehicle 100.

The traveling environment of the vehicle 100 includes a condition of a periphery of the traveling path (hereinafter called the present traveling path) where the vehicle 100 is currently traveling, and a condition of a periphery of a traveling path (hereinafter called an expected traveling path) where the vehicle 100 is expected to travel.

More specifically, the traveling environment of the vehicle 100 may include a condition of a vehicle traveling on the present traveling path and the expected traveling path, conditions of traffic lights on the present traveling path and the expected traveling path, road surface conditions of the present traveling path and the expected traveling path, and conditions of traffic lanes of the present traveling path and the expected traveling path. Further, the traveling environment of the vehicle 100 may include congestion states of the present traveling path and the expected traveling path, accident occurrence states of the present traveling path and the expected traveling path, traffic regulation states of the present traveling path and the expected traveling path, and road construction states of the present traveling path and the expected traveling path. Further, the traveling environment of the vehicle 100 may include states of pedestrians walking on the present traveling path and the expected traveling path, states of structures existing near the present traveling path and the expected traveling path, and a weather condition of a periphery of the present traveling path and the expected traveling path.

Therefore, the traveling environment specification unit 401 acquires, as the traveling environment information, detection result information of a sensor (for example, a camera or radar), for example, from the sensor system ECU 104. Further, the traveling environment specification unit 401 may acquire, as the traveling environment information, map information, the traffic information and the weather information (narrow-area weather information or wide-area weather information) by the dynamic map 600 from the roadside communication device 103, for example.

Furthermore, the traveling environment specification unit 401 may acquire, as the traveling environment information, a peripheral vehicle information, pedestrian information, traffic light information, accident information, congestion information, traffic restriction information, road construction information, road surface information, traffic lane information and three-dimensional structural information, etc. by the dynamic map 600.

Then, the traveling environment specification unit 401 specifies the present traveling environment of the vehicle 100 by using such traveling environment information.

Further, the traveling environment specification unit 401 may specify the present traveling environment of the vehicle by using the map information 406 retained by the storage device 301.

In a normal time of traveling by automated driving, the traveling environment specification unit 401 notifies the driving operation control unit 402 and the failure countermeasure update unit 404 of the present traveling environment specified. The driving operation control unit 402 uses the present traveling environment of the vehicle 100 for traveling by automated driving. Further, the failure countermeasure update unit 404 uses the present traveling environment of the vehicle 100 for updating the countermeasure indicated in the failure correspondence table 405.

Furthermore, when a failure occurs in automated driving, the traveling environment specification unit 401 notifies the failure correspondence unit 403 of the present traveling environment of the vehicle 100 specified. The failure correspondence unit 403 uses the present traveling environment of the vehicle 100 so as to decide the countermeasure.

In a normal time of traveling by automated driving, the driving operation control unit 402 generates control information for traveling by automated driving based on the present traveling environment of the vehicle 100 and the map information 406 notified from the traveling environment specification unit 401. The control information indicates, for example, a traveling path to a destination, and details of control such as acceleration and deceleration, turning and stopping, etc. Then, the driving operation control unit 402 transmits the control information to the drive system ECU 106 via the input/output device 302.

When a failure occurs in traveling by automated driving, the driving operation control unit 402 transmits the control information for realizing the countermeasure notified from the failure correspondence unit 403 to the drive system ECU 106 via the input/output device 302. The control information for realizing the countermeasure indicates a traveling path and details of control for realizing the countermeasure.

When a failure occurs in the apparatus mounted on the vehicle 100, the failure correspondence unit 403 selects a countermeasure by referring to the failure correspondence table 405 based on the failure details specified by the vehicle condition specification unit 400 and the present traveling environment of the vehicle 100 specified by the traveling environment specification unit 401. Then, the failure correspondence unit 403 notifies the driving operation control unit 402 of the countermeasure selected.

The failure countermeasure update unit 404 updates the countermeasure indicated in the failure correspondence table 405 in accordance with a change in the traveling environment.

Specifically, the failure countermeasure update unit 404 first reads the failure correspondence table 405 from the storage device 301.

Then, the failure countermeasure update unit 404 determines whether to update the countermeasure indicated in the failure correspondence table 405 based on the present traveling environment of the vehicle 100 notified from the traveling environment specification unit 401.

More specifically, the failure countermeasure update unit 404 determines whether a change that requires update of the countermeasure indicated in the failure correspondence table 405 occurs in the present traveling environment notified from the traveling environment specification unit 401. Then, if a change that requires update of the countermeasure indicated in the failure correspondence table 405 occurs in the present traveling environment, the failure countermeasure update unit 404 updates a relevant countermeasure in the failure correspondence table 405 in accordance with the change.

The failure correspondence table 405 indicates countermeasures against failures for combinations of a failure details and a traveling environment.

In the example of FIG. 7, it is indicated as a countermeasure, that the vehicle 100 is made to travel to a nearest repair plant by a degeneration function when a failure occurs in any of the control devices 200 while the vehicle 100 is traveling on an expressway. For example, when a change occurs in the present travel environment that makes it difficult for the vehicle 100 to travel to the nearest repair plant by the degeneration function, the failure countermeasure update unit 404 updates the countermeasure in accordance with the change in the traveling environment.

Further, the failure countermeasure update unit 404 may independently collect information from the roadside communication device 103, the sensor system ECU 104 and the drive system ECU 106, in addition to a notification of the present traveling environment of the vehicle 100 from the traveling environment specification unit 401, refer to the information collected, and determine whether a change occurs that influences the countermeasure indicated in the failure correspondence table 405 in the present traveling environment of the vehicle 100.

The operation performed by the failure countermeasure update unit 404 corresponds to table reading process and failure countermeasure update process.

The map information 406 is conventional and static map information such as road surface information, traffic lane information and two-dimensional structural information.

The map information 406 is used for traveling by automated driving.

Since the map information 406 is what is included in the dynamic map in terms of contents, the map information 406 is complementarily used in a case wherein the dynamic map 600 cannot be acquired due to insufficient communication conditions, or the like.

The dynamic map 600 is a high-precision three-dimensional map managed by a server device on a network connecting to a roadside unit installed at a road side.

In the dynamic map 600, the map information and the traffic information are managed by being divided into hierarchies based on the degree of temporal variation. The information included in the dynamic map 600 is dynamic information (a peripheral vehicle information, pedestrian information, signal information, etc.), a quasi-dynamic information (accident information, congestion information, narrow-area weather information, etc.), quasi-static information (traffic restriction information, road construction information, wide-area weather information, etc.), static information (road-surface information, traffic lane information, three-dimensional structure, etc.) and so on.

Figure 3:
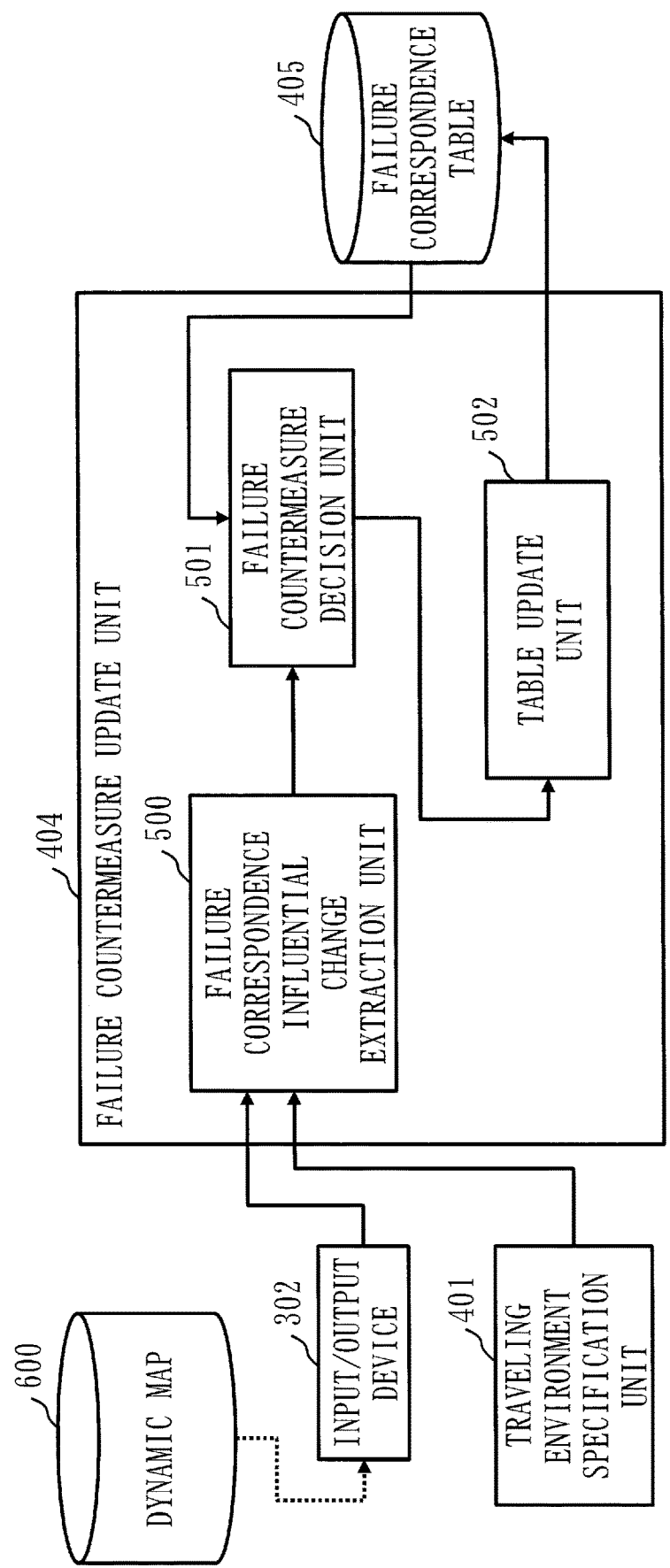
FIG. 3 is a diagram illustrating an example of a functional configuration of a failure countermeasure update unit according to the first embodiment.

FIG. 3 illustrates an example of a functional configuration of a failure countermeasure update unit 404 according to the first embodiment.

A failure correspondence influential change extraction unit 500 acquires information to notify of the present traveling environment of the vehicle 100 from the traveling environment specification unit 401. Further, the failure correspondence influential change extraction unit 500 may acquire map information, traffic information and weather information of the dynamic map 600 output from the roadside communication device 103 via the input/output device 302.

Further, the failure correspondence influential change extraction unit 500 analyzes whether there is a change (hereinafter called a failure correspondence influential change) which may influence the countermeasure on occurrence of a failure in the present traveling environment of the vehicle 100 notified from the traveling environment specification unit 401. Furthermore, the failure correspondence influential change extraction unit 500 may analyze whether there is the failure correspondence influential change based on the map information, the traffic information and the weather information.

When there is the failure correspondence influential change, the failure correspondence influential change extraction unit 500 extracts the failure correspondence influential change.

The failure correspondence influential change extraction unit 500 extracts, as the failure correspondence influential change, for example, a change in a traffic volume in the present traveling path and the expected traveling path, a change in a construction state or a restriction state of a periphery of a road shoulder of the present traveling path and the expected traveling path, a change in a weather condition (change in a weather condition that may influence traveling by automated driving) of the present traveling path and the expected traveling path and so forth. Further, the failure correspondence influential change extraction unit 500 may acquire detection result information of a sensor from the sensor system ECU 104, and based on the detection result information, extract a change, as for whether the driver of the vehicle 100 is in a state of being able to shift to traveling by manual driving rapidly, as the failure correspondence influential change.

The failure countermeasure decision unit 501 determines whether update of the countermeasure in the failure correspondence table 405 is required. Specifically, the failure countermeasure decision unit 501 determines whether a failure correspondence influential change extracted by the failure correspondence influential change extraction unit 500 is a change that requires update of the countermeasure in the failure correspondence table 405. Then, when the failure correspondence influential change is the change that requires update of the countermeasure in the failure correspondence table 405, the failure countermeasure decision unit 501 decides to update the relevant countermeasure in the failure correspondence table 405 in accordance with the failure correspondence influential change.

For example, as illustrated in FIG. 7, as a countermeasure in a case wherein a failure occurs in any of the control devices 200 while the vehicle 100 is traveling on an expressway, it is assumed to be indicated in the failure correspondence table 405 that the vehicle 100 is made to travel to a nearest repair plant by the degeneration function. Furthermore, it is assumed that the failure correspondence influential change extraction unit 500 extracts a failure correspondence influential change that a road shoulder of the present traveling path is narrow due to a construction, and a failure correspondence influential change that a dense fog is generated on a traveling path from the current position of the vehicle 100 to the nearest repair plant.

In this case, since it is difficult for the vehicle 100 to travel to the repair plant by automated driving, the failure countermeasure decision unit 501 determines that these failure correspondence influential changes are changes that require update of the countermeasure in the failure correspondence table 405. Then, the failure countermeasure decision unit 501 decides to update the countermeasure in the failure correspondence table 405 in accordance with these failure correspondence influential changes. For example, as illustrated in FIG. 8, the failure countermeasure decision unit 501 decides to update to a countermeasure that "stop a vehicle at a road shoulder after passing a construction site".

Further, the failure countermeasure decision unit 501 decides to return the countermeasure as illustrated in FIG. 8 to the countermeasure as illustrated in FIG. 7 when it is confirmed that the vehicle 100 has passed the construction site, and the dense fog disappears.

In a decision procedure of a countermeasure based on the failure correspondence influential change, it is possible to apply an artificial intelligence (AI) technique including machine learning and deep learning. Applying the AI technique makes it possible to decide a countermeasure high in safety that is more likely to suite the situation.

A table update unit 502 rewrites a relevant description in the failure correspondence table 405 based on the countermeasure decided by the failure countermeasure decision unit 501.

Description Of Operation

Figure 4:
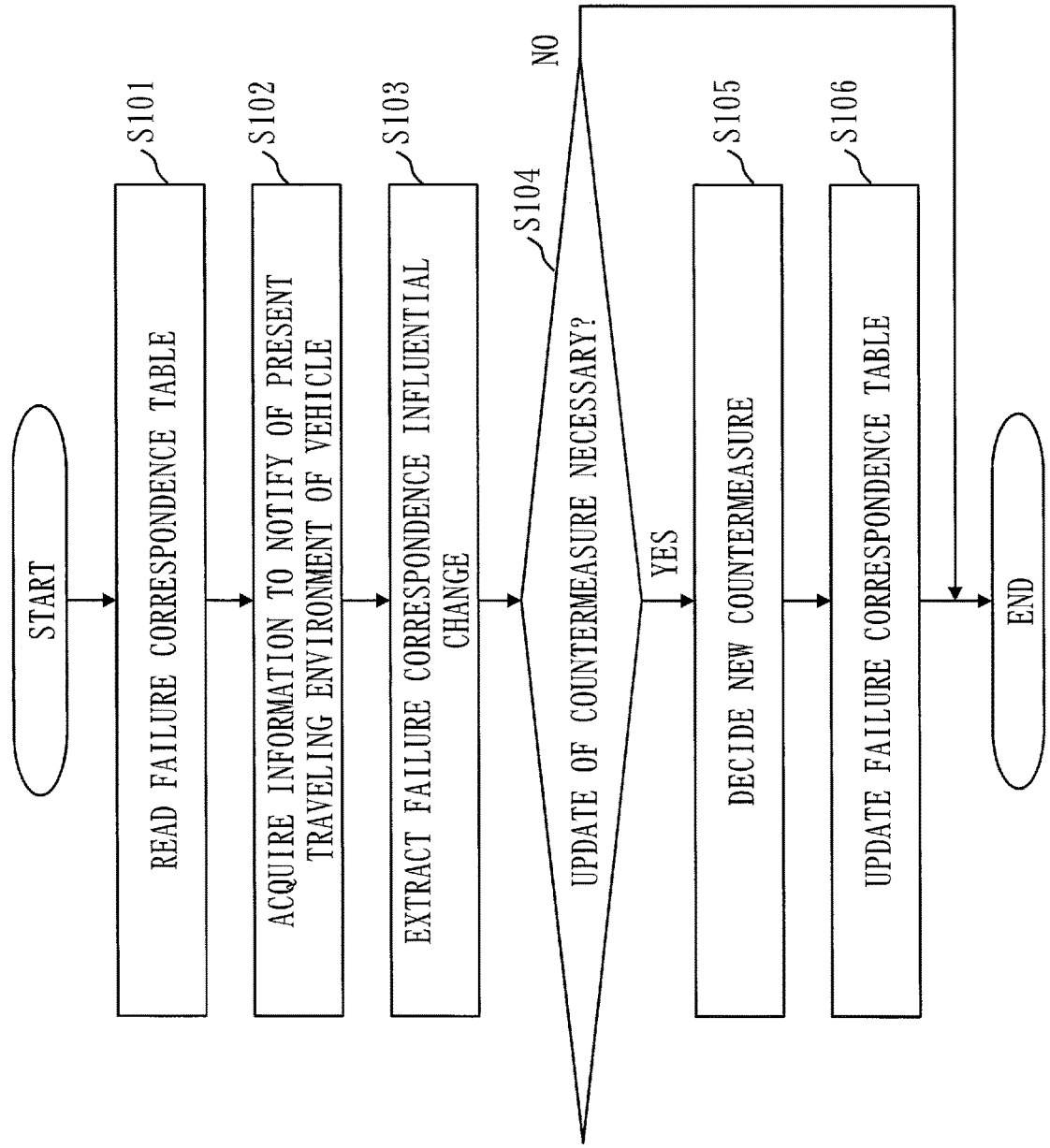
FIG. 4 is a flowchart illustrating an example of an operation of the control device according to the first embodiment.

Next, a process flow of the control device 200 pertaining to the failure countermeasure update unit 404 will be described using FIG. 4. The process flow in FIG. 4 is repeated with a period of approximately several seconds to several minutes while the vehicle 100 is traveling by automated driving.

First, the failure countermeasure decision unit 501 reads the failure correspondence table 405 from the storage device 301 (step S101).

Next, the failure correspondence influential change extraction unit 500 acquires information notifying of a present traveling environment of the vehicle output from the traveling environment specification unit 401 (step S102).

The order of the processing of step S101 and step S102 is interchangeable.

Further, the failure correspondence influential change extraction unit 500 may acquire map information, traffic information and weather information of the dynamic map output from the roadside communication device 103.

Next, the failure correspondence influential change extraction unit 500 extracts a failure correspondence influential change based on the present traveling environment of the vehicle 100 notified (step S103).

Next, the failure countermeasure decision unit 501 determines whether the failure correspondence influential change extracted in step S103 is a change that requires update of the countermeasure in the failure correspondence table 405 (step S104).

When the failure correspondence influential change is not a change that requires update of the countermeasure in the failure correspondence table 405 (NO in step S104), since it is unnecessary to update the countermeasure in the failure correspondence table 405, the process flow ends.

Meanwhile, when the failure correspondence influential change is a change that requires update of the countermeasure in the failure correspondence table 405 (YES in step S104), the failure countermeasure decision unit 501 decides a new countermeasure in accordance with the failure correspondence influential change (step S105).

Lastly, the table update unit 502 updates a relevant description in the failure correspondence table 405 based on the new countermeasure decided in step S105 (step S106).

It is also possible for the failure countermeasure decision unit 501 to perform determination in step S105 as follows.

At the time when the flow in FIG. 4 is performed in a previous cycle, the failure correspondence influential change extraction unit 500 stores a failure correspondence influential change extracted in the storage device 301. Then, the failure countermeasure decision unit 501 compares a failure correspondence influential change extracted in step S103 in the present cycle with the failure correspondence influential change extracted in the previous cycle in the storage device 301. When there is no difference between two failure correspondence influential changes, the failure countermeasure decision unit 501 determines that it is unnecessary to update the countermeasure and ends the process flow.

Description Of Effect of Embodiment

As described above, in the present embodiment, the failure countermeasure update unit 404 updates the countermeasure described in the failure correspondence table 405 in accordance with the change in the traveling environment of the vehicle 100. Therefore, according to the present embodiment, when a failure occurs in an apparatus mounted on the vehicle 100, it is possible to select a suitable countermeasure in accordance with the traveling environment of the vehicle 100 that changes from moment to moment. For example, according to the present embodiment, in accordance with the traveling environment of the vehicle 100 that changes from moment to moment, it is possible to select a countermeasure that can ensure safety more of a user of the vehicle 100.

Variation of First Embodiment

The above describes the configuration wherein the countermeasure in one failure correspondence table 405 is updated.

Instead of this, the storage device 301 may store the failure correspondence table 405 for each road type. Then, the failure countermeasure update unit 404 may update the countermeasure in the failure correspondence table 405 corresponding to a road type of a traveling path on which the vehicle 100 is currently traveling. When the traveling path of the vehicle 100 is switched, the failure countermeasure update unit 404 updates a countermeasure in the failure correspondence table 405 corresponding to a road type of a new traveling path.

For example, the failure countermeasure update unit 404 detects that the road type is switched by analyzing the present traveling environment of the vehicle 100 notified from the traveling environment specification unit 401, and switches the failure correspondence table 405 to refer to.

Second Embodiment

In the first embodiment, it is possible for the failure countermeasure update unit 404 to determine whether update of the countermeasure is required by extracting the failure correspondence influential change using the map information, the traffic information and the weather information obtained from the dynamic map 600. However, the information provided by the dynamic map 600 is enormous, and it is supposed that a long time is taken for processing of the information provided by the dynamic map 600 with hardware performance of the control device 200 mounted on the vehicle 100. Therefore, there is a case wherein extraction of the failure correspondence influential change from the dynamic map 600 is not effective.

In the present embodiment, an example wherein the failure countermeasure update unit 404 acquires failure correspondence influential change information indicating a failure correspondence influential change, from the dynamic map 600.

In the following, different parts from the first embodiment will be described.

Matters that are not described below are the same as those in the first embodiment.

Description Of Configuration

Figure 5:
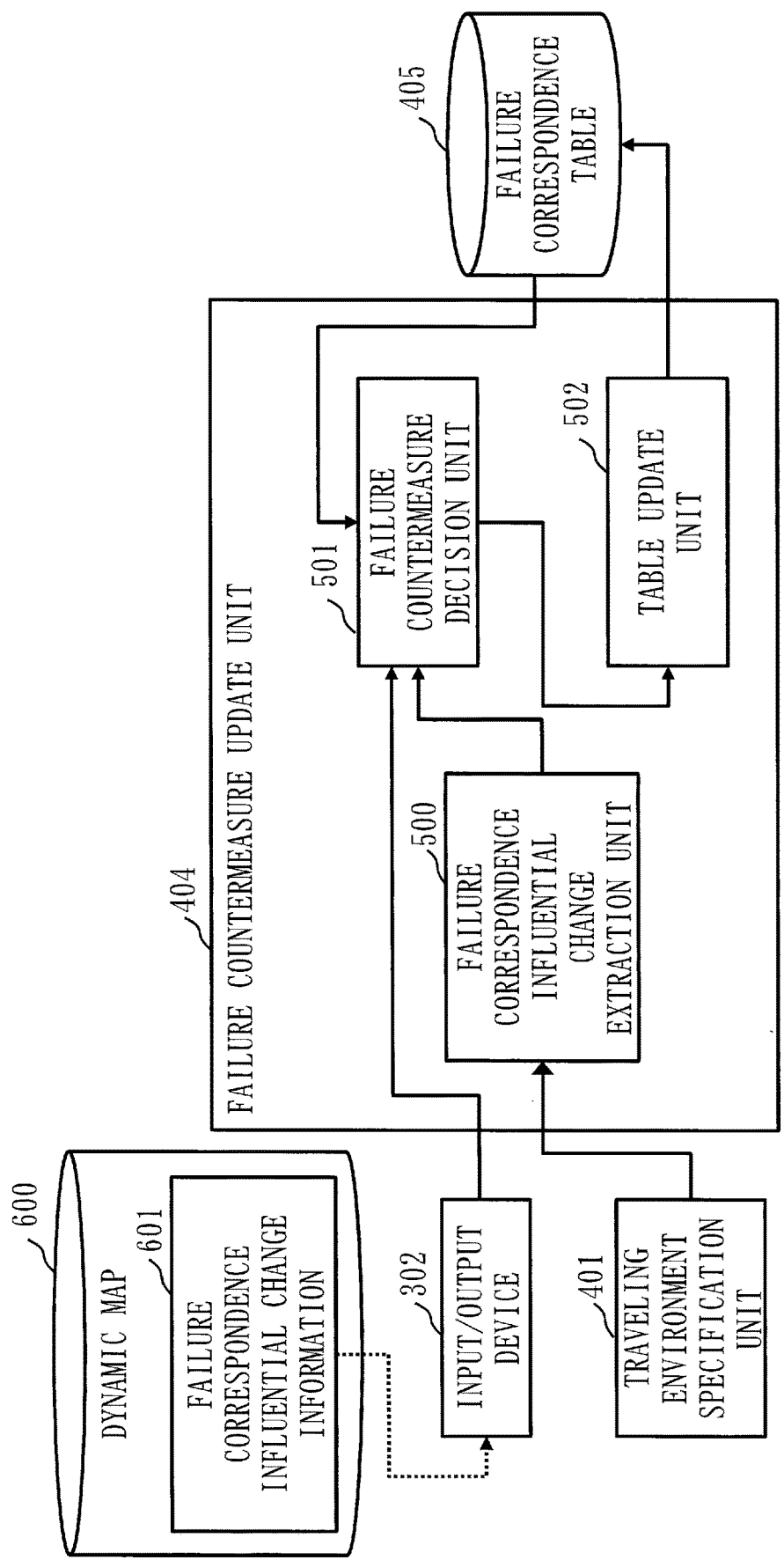
FIG. 5 is a diagram illustrating an example of a functional configuration of a failure countermeasure update unit according to a second embodiment.

FIG. 5 illustrates an example of a functional configuration of a failure countermeasure update unit 404 and a dynamic map 600 according to a second embodiment.

A failure correspondence influential change extraction unit 500 extracts a failure correspondence influential change from information other than the dynamic map 600. That is, in the present embodiment, the failure correspondence influential change extraction unit 500 extracts the failure correspondence influential change from information notifying of the present traveling environment of a vehicle 100 from a traveling environment specification unit 401, and detection result information of a sensor.

A failure countermeasure decision unit 501 acquires failure correspondence influential change information 601 from the dynamic map 600. The failure correspondence influential change information 601 is information notifying of a change (failure correspondence influential change) that may influence a countermeasure, in at least any of a geographical condition of a present traveling path and an expected traveling path, a traffic condition of the present traveling path and the expected traveling path, and a weather condition of the present traveling path and the expected traveling path.

Then, the failure countermeasure decision unit 501 refers to the failure correspondence influential change information 601, and determines whether a change that requires update of a countermeasure indicated in a failure correspondence table 405 occurs in the present traveling environment of the vehicle 100. That is, the failure countermeasure decision unit 501 integrates the failure correspondence influential change extracted by the failure correspondence influential change extraction unit 500, and a failure correspondence influential change indicated in the failure correspondence influential change information 601, and determines whether a change that requires update of the countermeasure indicated in the failure correspondence table 405 occurs, in the present traveling environment.

In the present embodiment, in the dynamic map 600, failure correspondence influential change information 601 corresponding to each road position is added as new provision information.

A server device managing the dynamic map 600 performs analysis of map information, traffic information and weather information of the dynamic map 600, extracts a failure correspondence influential change corresponding to each road position, and generates the failure correspondence influential change information 601.

Description Of Operation

Next, a process flow of the failure countermeasure update unit 404 according to the second embodiment will be described using FIG. 6.

Figure 6:
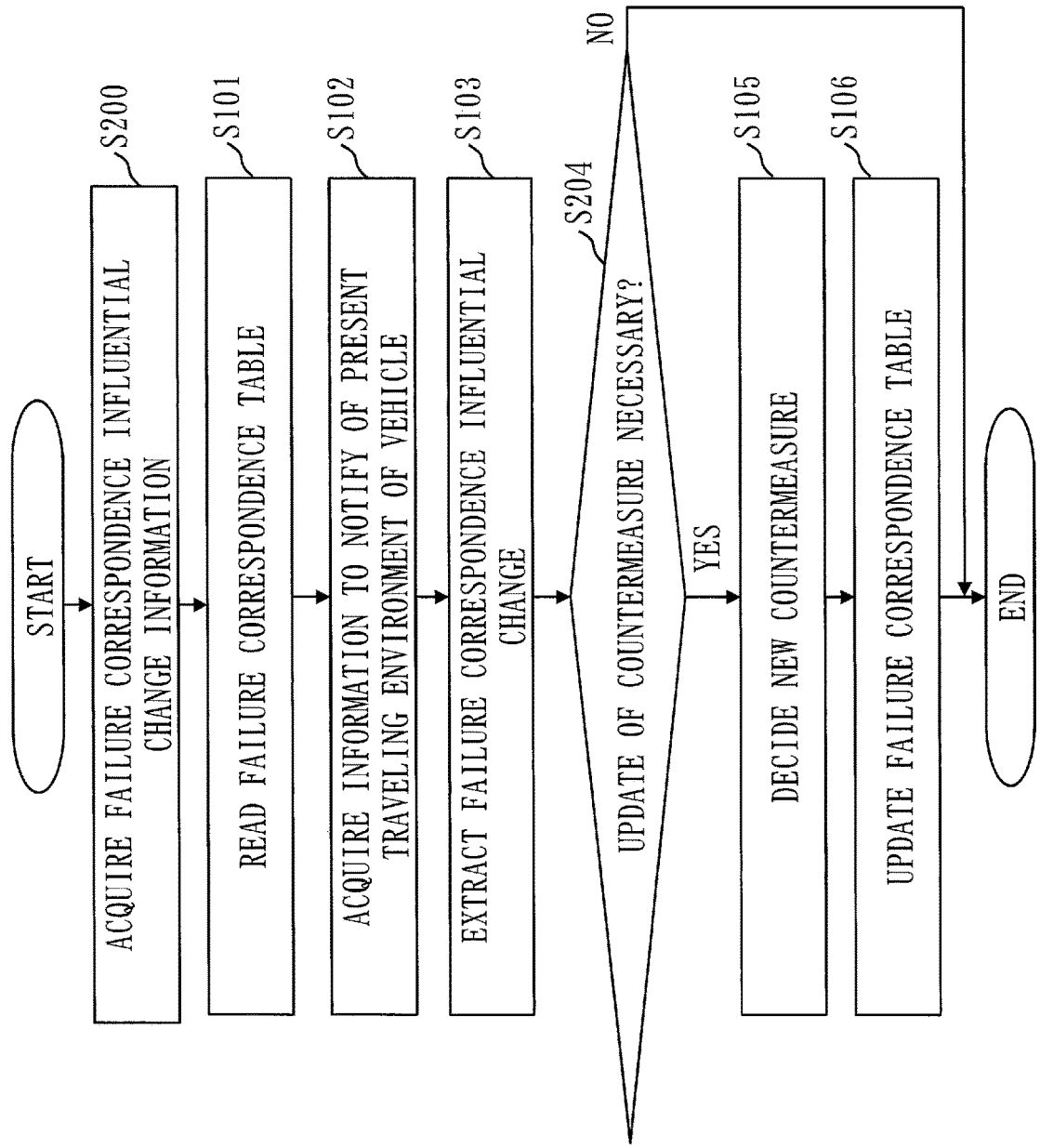
FIG. 6 is a flowchart illustrating an example of an operation of a control device according to the second embodiment.

In FIG. 6, compared to FIG. 4, step S200 is added, and step S104 is replaced with step S204.

Since each step other than step S200 and step S204 is the same as that illustrated in FIG. 4, step S200 and step S204 are only described in the following.

In step S200, the failure countermeasure decision unit 501 acquires the failure correspondence influential change information 601 from the dynamic map 600.

The order of steps S200, S101 and S102 is interchangeable.

In step S204, the failure countermeasure decision unit 501 determines whether the failure correspondence influential change extracted in step S103 and the failure correspondence influential change indicated in the failure correspondence influential change information 601 acquired in step S200 are changes that require update of a countermeasure in the failure correspondence table 405.

Description Of Effect of Embodiment

In the present embodiment, as one type of information provided in the dynamic map 600, the failure correspondence influential change information 601 is added. Then, the failure countermeasure decision unit 501 acquires the failure correspondence influential change information 601, and uses the failure correspondence influential change information 601 for decision of whether update of the countermeasure in the failure correspondence table 405 is required. In this way, it is possible to perform update of the countermeasure efficiently even in the control device 200 incorporated in the vehicle 100 whose processing performance is not as high as a workstation.

Variation of Second Embodiment

In the above, the failure countermeasure decision unit 501 acquires the failure correspondence influential change information 601 from the dynamic map 600, and decides whether it is necessary to update the countermeasure in the failure correspondence table 405 by using the failure correspondence influential change extracted by the failure correspondence influential change extraction unit 500 and the failure correspondence influential change indicated in the failure correspondence influential change information 601.

Instead of this, the failure countermeasure decision unit 501 may acquire update candidate information indicating a candidate (hereinafter referred to as an update candidate) for a countermeasure after update of the countermeasure in the failure correspondence table 405.

In this case, the failure countermeasure decision unit 501 determines whether the update candidate indicated in the update candidate information is appropriate. When the update candidate is appropriate, the failure countermeasure decision unit 501 updates a relevant countermeasure in the failure correspondence table 405 in accordance with the update candidate. For example, the failure countermeasure decision unit 501 refers to detection result information of a sensor, and determines whether the update candidate is appropriate.

Further, the update candidate information is generated in a server device that manages the dynamic map 600. The server device that manages the dynamic map 600 analyzes failure correspondence influential change information of the dynamic map 600, and derives the update candidate.

While the embodiments of the present invention have been described in the foregoing, these two embodiments may be combined for implementation.

Alternatively, of these two embodiments, one may be partially implemented.

Alternatively, these two embodiments may be partially combined for implementation.

Note that the present invention is not limited to these embodiments and can be variously changed as required.

*Description of Hardware Configuration*

Lastly, a supplementary description of a hardware configuration of the control device 200 will be presented.

The storage device 301 illustrated in FIG. 1 also stores an operating system (OS).

Then, at least a part of the OS is executed by the processor 300.

The processor 300 executes a program to realize the functions of the vehicle condition specification unit 400, the traveling environment specification unit 401, the driving operation control unit 402, the failure correspondence unit 403 and the failure countermeasure update unit 404 while executing at least a part of the OS.

By executing the OS by the processor 300, task management, memory management, file management and communication control, etc. are performed.

Further, at least any of information, data, signal values and variable values indicating the result of the process by the vehicle condition specification unit 400, the traveling environment specification unit 401, the driving operation control unit 402, the failure correspondence unit 403 and the failure countermeasure update unit 404 is stored in at least any of the storage device 301, a register and a cache memory inside the processor.

Furthermore, the program to realize the functions of the vehicle condition specification unit 400, the traveling environment specification unit 401, the driving operation control unit 402, the failure correspondence unit 403 and the failure countermeasure update unit 404 may be stored in a portable recording medium such as a magnetic disk, a flexible disk, an optical disk, a compact disk, a Blue-ray (registered trademark) disk and a DVD, etc.

Further, "unit" of the vehicle condition specification unit 400, the traveling environment specification unit 401, the driving operation control unit 402, the failure correspondence unit 403 and the failure countermeasure update unit 404 may be read as "circuit", "step", "procedure" or "process".

In addition, the control device 200 may be realized by a processing circuit. The processing circuit is, for example, a logic integrated circuit (IC), a gate array (GA), an application specific integrated circuit (ASIC), a field-programmable gate array (FPGA).

In the present description, a superordinate concept of the processor and the processing circuit is called "processing circuitry".

That is, the processor and the processing circuit are respectively a specific example of the "processing circuitry".

REFERENCE SIGNS LIST

100: vehicle; 101: ADAS-ECU; 102: input device; 103: roadside communication device; 104: sensor system ECU; 105: output device; 106: drive system ECU; 200: control device; 201: multiplex system management device; 300: processor; 301: storage device; 302: input/output device; 400: vehicle condition specification unit; 401: traveling environment specification unit; 402: driving operation control unit; 403: failure correspondence unit; 404: failure countermeasure update unit; 405: failure correspondence table; 406: map information; 500: failure correspondence influential change extraction unit; 501: failure countermeasure decision unit; 502: table update unit; 600: dynamic map; 601: failure correspondence influential change information

The invention claimed is:
1. An in-vehicle device to be mounted on a vehicle, the in-vehicle device comprising:
a storage device to store a failure correspondence table that indicates a countermeasure for a time when a failure occurs in an apparatus mounted on the vehicle, and
processing circuitry to
extract a change in a present traveling environment of the vehicle which may influence a countermeasure to be taken on occurrence of a failure in the present traveling environment,
determine whether the extracted change requires an update of a countermeasure indicated in the failure correspondence table,
change, when the extracted change is determined to require an update a relevant countermeasure in the failure correspondence table in accordance with the extracted change, and
transmit, when a failure occurs in an apparatus mounted on the vehicle, control information for realizing a countermeasure indicated in the failure correspondence table to a drive system of the vehicle, and control the drive system of the vehicle based on the transmitted control information.

2. The in-vehicle device as defined in claim 1, wherein the processing circuitry acquires, as traveling environment information, at least any of map information of a traveling path of the vehicle, traffic information of the traveling path of the vehicle, and weather information of the traveling path of the vehicle, and detection result information of a sensor mounted on the vehicle, and specifies the present traveling environment of the vehicle based on the traveling environment information acquired, and determines whether the extracted change requires an update of a countermeasure indicated in the failure correspondence table.

3. The in-vehicle device as defined in claim 2, wherein the processing circuitry acquires failure correspondence influential change information that notifies of a change that may influence a countermeasure indicated in the failure correspondence table, in at least any of a geographical condition of the traveling path of the vehicle, a traffic condition of the traveling path of the vehicle and a weather condition of the traveling path of the vehicle, and refers to the failure correspondence influential change information, and determines whether the extracted change requires an update of a countermeasure indicated in the failure correspondence table.

4. The in-vehicle device as defined in claim 2, wherein the processing circuitry acquires the traveling environment information repeatedly while a failure does not occur in the apparatus mounted on the vehicle, and specifies the present traveling environment of the vehicle every time the traveling environment information is acquired, and determines whether the extracted change requires an update of a countermeasure indicated in the failure correspondence table every time the present traveling environment of the vehicle is specified.

5. The in-vehicle device as defined in claim 1, wherein the storage unit stores the failure correspondence table for each road type, and wherein the failure countermeasure update unit updates a countermeasure corresponding to a road type of a traveling path of the vehicle, indicated in a failure correspondence table.

6. The in-vehicle device as defined in claim 1, wherein the failure countermeasure update unit acquires update candidate information wherein an update candidate being a candidate for a countermeasure after an update of a countermeasure in the failure correspondence table is indicated, and determines whether the update candidate indicated in the update candidate information is appropriate, and when the update candidate is appropriate, updates a relevant countermeasure in the failure correspondence table, in accordance with the update candidate.

7. An information processing method comprising:

by a computer mounted on a vehicle, reading a failure correspondence table that indicates a countermeasure for a time when a failure occurs in an apparatus mounted on the vehicle, from a storage area, by the computer, extracting a change in a present traveling environment of the vehicle which may influence a countermeasure to be taken on occurrence of a failure in the present traveling environment, by the computer, determining whether the extracted change requires an update of a countermeasure indicated in the failure correspondence table, and when the change that requires the update of the countermeasure indicated in the failure correspondence table occurs changing a relevant countermeasure in the failure correspondence table in accordance with the extracted change, by the computer, transmitting, when a failure occurs in an apparatus mounted on the vehicle, control information for realizing a countermeasure indicated in the failure correspondence table to a drive system of the vehicle, and controlling the drive system of the vehicle based on the transmitted control information.

8. A non-transitory computer readable medium storing information processing program that causes a computer mounted on a vehicle to perform:

a table reading process of reading a failure correspondence table that indicates a countermeasure for a time when a failure occurs in an apparatus mounted on the vehicle, from a storage area, an extraction process of extracting a change in a present traveling environment of the vehicle which may influence a countermeasure to be taken on occurrence of a failure in the present traveling environment, a failure countermeasure updating process of determining whether the extracted change requires an update of a countermeasure indicated in the failure correspondence table, and when the extracted change requires the update of the countermeasure changing a relevant countermeasure in the failure correspondence table in accordance with the extracted change;

a countermeasure implementation process of transmitting, when a failure occurs in an apparatus mounted on the vehicle, control information for realizing a countermeasure indicated in the failure correspondence table to a drive system of the vehicle; and a control process of controlling the drive system of the vehicle based on the transmitted control information.

* * * * *